C. H. HOWARD & H. M. PFLAGER.
CAR TRUCK.
APPLICATION FILED JULY 10, 1911.
1,039,404.
Patented Sept. 24, 1912.
3 SHEETS—SHEET 1.
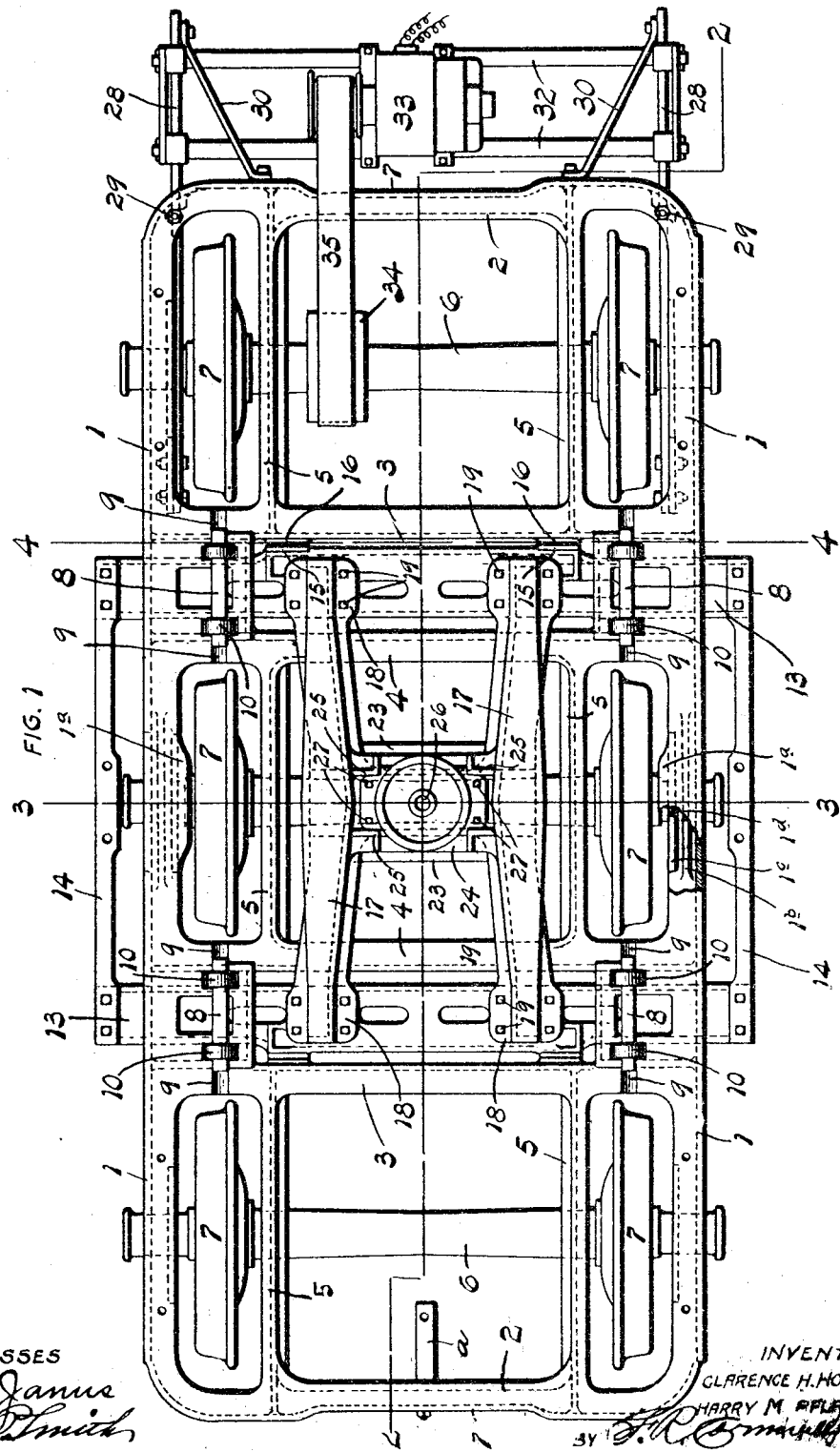
WITNESSES
INVENTORS
CLARENCE H. HOWARD
HARRY M. PFLAGER
BY ATTY.

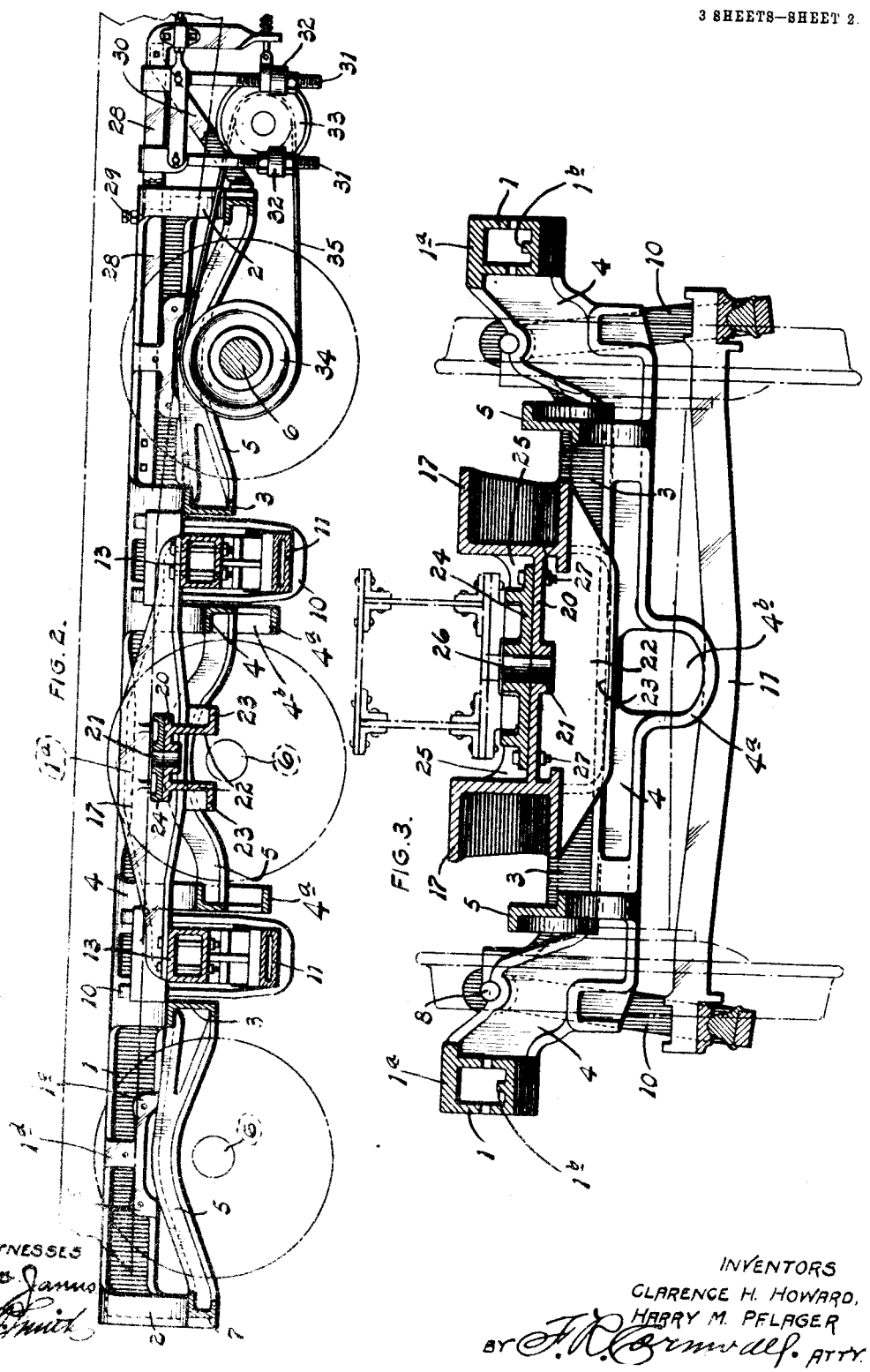

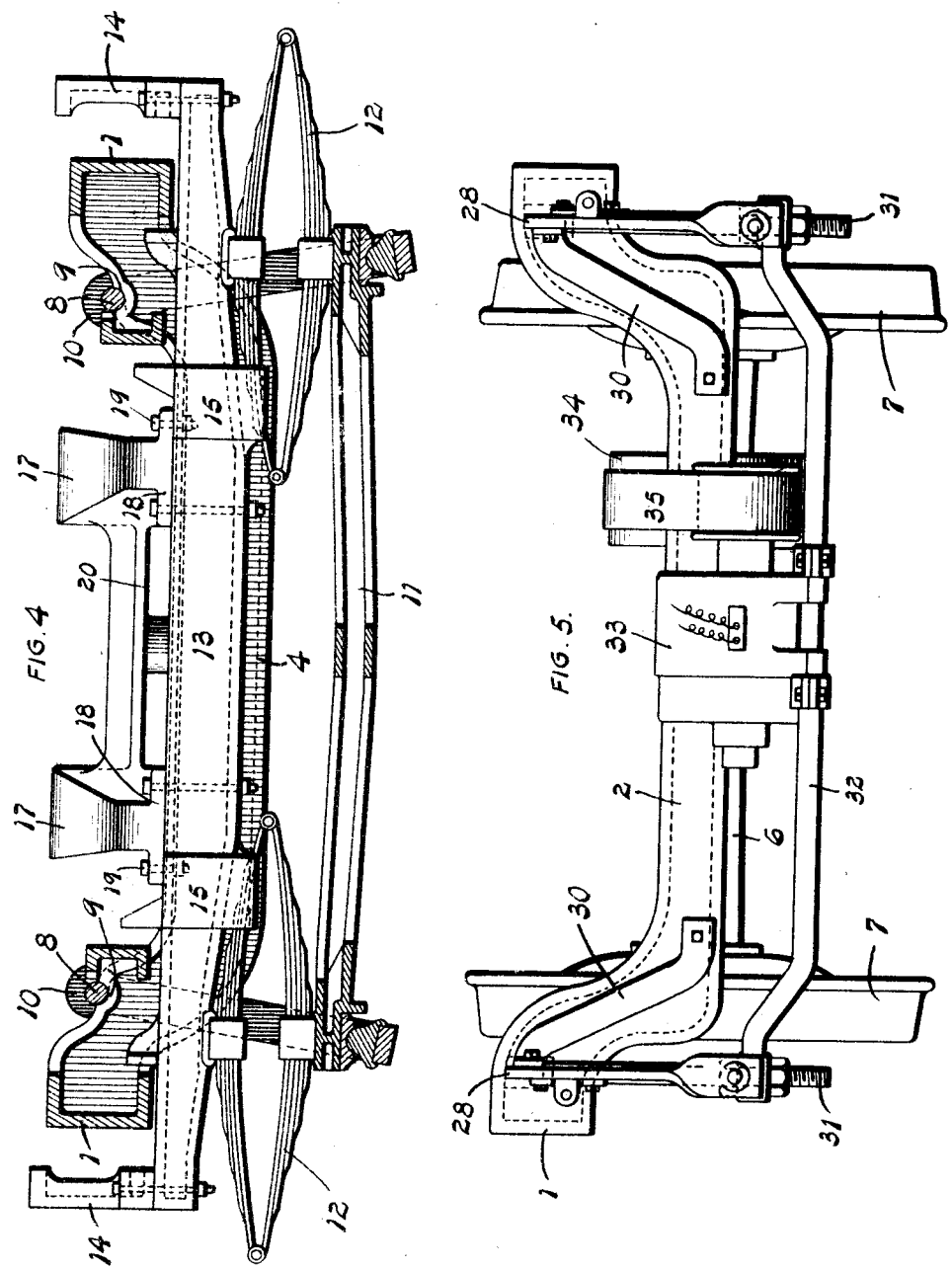

UNITED STATES PATENT OFFICE.

CLARENCE H. HOWARD AND HARRY M. PFLAGER, OF ST. LOUIS, MISSOURI, ASSIGNORS TO DOUBLE BODY BOLSTER COMPANY, OF ST. LOUIS, MISSOURI, A CORPORATION OF NEW JERSEY.

CAR-TRUCK.

1,039,404.  Specification of Letters Patent.  Patented Sept. 24, 1912.

Application filed July 10, 1911. Serial No. 637,810.

*To all whom it may concern:*

Be it known that we, CLARENCE H. HOWARD and HARRY M. PFLAGER, citizens of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification, in which—

Figure 1 is a plan view of a car truck of our improved construction. Fig. 2 is a vertical section taken approximately on the line 2—2 of Fig. 1. Fig. 3 is an enlarged transverse section taken approximately on the line 3—3 of Fig. 1. Fig. 4 is an enlarged transverse section taken approximately on the line 4—4 of Fig. 1. Fig. 5 is an end elevation of the truck.

Our invention relates to a railway car truck, our principal object being to provide a simple truck of the six-wheel variety wherein great strength and rigidity is combined with lightness of weight, and which truck is particularly designed to receive a car body and under frame having a very deep center girder.

It is at present the general practice to equip standard passenger cars with under frames having a center girder of the fish-belly type, that is a girder wherein the central portion is much deeper than the end portions, and such construction necessitates a truck having a center bearing plate which is closer to the rails than are the center plates in trucks of ordinary construction, and to this end we have devised a truck wherein the center bolster or member carrying the center bearing plate straddles the middle axle, thus permitting the center bearing plate to be located in a plane below the ends of the center bolster and thus accommodating the center bearing plate carried by the extra deep center sill.

Our invention further relates to the particular manner of mounting the generator of the axle driven lighting device, and which device must necessarily be placed very low in order to accommodate the extra deep center girder of the car under frame.

Our invention further consists in certain features of novelty hereinafter more fully described and claimed.

The truck frame illustrated in the accompanying drawings is of the same general type as the truck frame shown and described in United States Letters Patent issued to our assignee November 8, 1904, Serial No. 774,492.

In the present instance the truck frame comprises side rails or wheel pieces 1, end rails 2, transversely disposed transoms 3 and 4 arranged in pairs, and arched axle guards 5, all of which parts are preferably cast integral.

The side rails 1 are preferably channel-shaped in cross section with the horizontal flanges projecting inwardly, the end pieces substantially box-shaped in cross section, the transoms substantially channel-shaped in cross section, and the axle guards 5 substantially Z-shaped in cross section, although it will be readily understood that all of the parts just mentioned may be of any desired shape in cross section, as for instance, I, T, L, or of inverted U-shape.

We prefer to make the axle guards Z-shaped in cross section, with the lower flange projecting inward toward the longitudinal center of the truck frame to provide ample clearance for the wheel hubs and the upper flange of said axle guard is turned outward to provide ample clearance for the sill of the car when the truck frame swings upon its pivot beneath the car under frame.

The greatest compression strains on the side rails 1 of the truck frame occur at the points approximately midway between their ends or at points immediately above the journal boxes of the center axle and to materially strengthen the side rails at their centers, the top horizontal flange of each side member is preferably widened and thickened at its center as designated by $1^a$ thereby materially increasing the strength of said side member at its pivotal point. To further reinforce and strengthen the central portion of the side member a longitudinally disposed rib or strengthening flange $1^b$ is formed on top of the lower horizontal member of the side rail at its center.

At the points where the pedestals are attached to the side rails or wheel pieces 1, the bottom flanges of said wheel pieces are provided with integral lugs $1^c$ that are perforated in order to receive the horizontally disposed side bolts utilized for attaching said pedestals. Midway between these pairs of perforated lugs 1ᶜ are vertically disposed plates or brackets 1ᵈ that are integral with the top flanges of the wheel pieces, and which plates or brackets are perforated so as to receive the horizontally disposed center bolts utilized for attaching the pedestals. (See Fig. 2.)

The side rails 1 are provided with horizontal perforations adapted to receive the horizontally disposed side bolts utilized for attaching the pedestals and midway between these lugs 1ᶜ upon the inside of said side rails are vertically disposed plates or brackets 1ᵈ which are perforated horizontally and adapted to receive the center bolts utilized in attaching the pedestals. This construction provides ample strength for the side rails of the truck frame at the points where the pedestals are attached, and does away with considerable weight of the metal usually employed in forming a box like structure at the points where the pedestals are attached.

In order to accommodate the deep center girder of the car under frame, the central portions of the end pieces 2 and the transoms 3 and 4 are depressed so that they occupy approximately the same horizontal plane with the axles 6, and the depressed central portions of the end rails 2 are recessed or offset relative to the end portions of said end rails as designated by 7. By thus recessing or offsetting the end rails of the truck frame, the nuts and ends of the bolts used in fixing the center supporting arms $a$ for the outside hung brake beams at the ends of the truck frame, are protected from being battered and rendered unserviceable when the truck frames are first assembled and run out of the shops onto side tracks prior to their being positioned beneath the car bodies.

Heretofore it has generally been the practice to make truck frames with straight end rails, and after the trucks are assembled and run out onto side tracks the impact between the meeting ends of a pair of trucks results in a battering down and consequent injury to the projecting ends of the bolts and nuts used in attaching the center supporting arms for the brake beams, for these nuts, and the ends of the bolts project beyond the end faces of the end rails, and therefore, receive the full force of the buffing stresses between the meeting ends of a pair of truck frames, but where the central portions of said end frames are recessed or offset as herein shown and described, the nuts and projecting portions of the bolts are protected by reason of their being within or behind the buffing faces at the ends of the end rails 2.

8 designates horizontally disposed pins resting in suitable seats 9 formed in the tops of the transoms 3 and 4 adjacent the ends thereof, and said pins serve as pivotal supports for the upper ends of stirrups 10, which extend downward between the transoms 3 and 4, and the corresponding pairs of these stirrups support the ends of transversely disposed spring planks 11.

By referring to Figs. 3 and 4 it will be noted that each spring plank 11 is bent so that its central portion occupies a horizontal plane substantially below the horizontal plane occupied by its ends, this peculiar shape being essential in order to provide sufficient space and clearance between the tops of the central portions of the spring planks and the under sides of the axles 6 for the longitudinally disposed brake rods and levers carried by the truck. In order to accommodate these brake rods and levers the central portion of the bottom flange of each transom 4 is extended downward at the center as designated by 4ᵃ, and an opening 4ᵇ is formed through the vertically disposed web of said transom 4 immediately above the downwardly extended portion 4ᵃ of the horizontal flange. Positioned upon the ends of these spring planks are elliptic springs 12 and supported thereby between the pairs of transoms 3 and 4 are the truck bolsters 13 of the usual construction. The ends of these truck bolsters project slightly beyond the side rails 1 of the truck frame, and fixed to said projecting ends at each side of the truck frame are side bearing arch bars 14 of the usual construction.

Formed on the outer face of each bolster 13 is a pair of chafing plates 15, and formed on the inner faces of the transoms 3 are corresponding chafing plates 16. The center beam or bolster utilized in connection with our improved car truck is of the same general type as that shown in the patent issued to our assignee September 12, 1905, No. 799,085, and in the present instance the center beam or bolster comprises a pair of longitudinally disposed rails 17, the ends of which rest upon the truck bolsters 13, and are provided with ears 18 adapted to receive bolts or rivets 19, and which latter extend downward into the bolsters 13, thereby rigidly uniting said bolsters 13 and the rails 17.

Formed integral with the central portions of the rails 17 and in a plane substantially below the tops thereof is a horizontally disposed plate 20 in the center of which is formed an opening 21 through which the king pin is adapted to pass.

Formed integral with the under side of this plate 20 is a pair of vertically disposed transversely extending webs 22 which are intended to strengthen and reinforce the central portion of the center beam or bolster, and in order to accommodate the middle axle of the truck these webs 23 are spaced apart and straddle said middle axle (see Fig. 2). The lower edges of the vertically disposed web 22 are preferably strengthened by horizontally disposed flanges 23.

24 designates the center bearing plate, preferably of cast steel and which plate is positioned immediately on top of the plate 20. The end portions of this center bearing plate fit snugly between lugs or shoulders 25 formed on top of said plate 20, and formed through the center bearing plate 24 is a centrally disposed opening 26 which coincides with the opening 21. The center bearing plate 24 is rigidly fixed to the plate 20 by means of bolts or rivets 27.

In Fig. 3 we have illustrated in dotted lines the relative position of a deep center girder, and inasmuch as the plates 20 and 24 are placed as low as is practicable it will be seen that the lower portion of the deep center girder when properly positioned occupies a position below the plane occupied by the tops of the rails 17, and to permit the truck to swing laterally with respect to the fixed center girder the end portions of the rails 17 gradually diverge from the center bearing plate. (See Fig. 1.)

The center bearing plate 24 is made separate and is detachably applied to the plate 20 so as to permit of its being adjusted vertically, and to permit of its being removed when worn from use, and to be replaced by a new plate.

In order to accommodate an extra deep center girder the axle driven generator of the lighting device must necessarily occupy a comparatively low plane, and to accomplish this end we employ the following construction: A pair of rails 28 are bolted to the side rails 1 at one end of the truck frame, and which rails extend through suitably formed openings in the end portions of the corresponding rail 2. Set screws 29 are inserted through the ends of the end rail 2, and bear against the rails 28 to rigidly maintain them in position, and fixed to the outer ends of said rails 28 are the outer ends of braces 30, the inner ends of which are fixed to the corresponding end rail 2.

Depending from the projecting portions of the rails 28 are rods 31, and arranged for vertical adjustment on the lower portions of said rods are transversely disposed bars 32 upon the central portions of which is mounted a generator 33. A pulley 34 is applied to the adjacent axle 6, and connecting said pulley with the pulley of the generator is a belt 35.

The vertically adjustable bars 32 normally occupy a horizontal plane wherein the top of the generator 33 occupies approximately the same plane as that occupied by the top of the adjacent end rail 2, and thus the end of the truck frame carrying the axle driven generator is free to accommodate a center girder of extra depth.

A car truck of our improved construction is comparatively simple, combines great strength and rigidity with lightness of weight, and is especially designed to be used in connection with the prevailing types of passenger cars and underframes wherein extra deep center girders are generally employed.

It will be readily understood that minor changes in the size, construction and combination of the various parts of our device may be made and substituted for those herein shown and described without departing from the spirit of our invention, the scope of which is set forth in the appended claims.

We claim:

1. In a car truck, the combination with truck bolsters, of an H-shaped center bolster detachably applied to and supported by said truck bolsters, a center bearing plate detachably applied to the center member of said H-shaped bolster, and pairs of shoulders on the end portions of said center member, which shoulders engage the end portions of the center bearing plate.

2. In a car truck the combination with truck bolsters, of an H-shaped center bolster, a center bearing plate detachably applied to the center member of said center bolster, and pairs of lugs on the end portions of said center member which lugs engage the end portions of the center plate.

3. In a car truck, an H-shaped center bolster the center member of which is of inverted U-shape in cross section and lugs arranged in pairs on the end of said center member which lugs are adapted to engage the ends of a center bearing plate applied to said center member.

4. In a car truck, an H-shaped center bolster the center member of which is of inverted U-shape in cross section, and pairs of shoulders formed on the ends of said center member which shoulders are adapted to engage the ends of a center bearing plate applied to said center member.

5. In a car truck, the combination with truck bolsters, of an H-shaped center bolster, the central web of which is of inverted U-shape in cross section with the top plate of said central portion in a plane substantially below the plane occupied by the top of said center bolster, horizontally disposed strengthening flanges integral with the lower ends of the vertical legs of the inverted U-shaped central portion, pairs of lugs formed on the top plate of the central portion of said center bolster and a center bearing plate detachably applied to the top plate of said central portion, the end portions of which center bearing plate are positioned between the pairs of lugs on said top plate.

6. In a car truck of the class described, a truck frame comprising side walls, end rails, transoms and wheel guards, all of which parts are formed integral, said end rails and transoms having depressed central portions, truck bolsters yieldingly mounted between the transoms, a center bolster detachably applied fixed to and supported by said truck bolsters, the central portion of which center bolster is depressed relative to the remaining portion of said bolster so as to occupy a plane substantially below the plane occupied by the top of the truck frame and the top of the center bolster, and a center bearing plate detachably applied to the depressed central portion of said center bolster.

7. In a car truck, a truck frame having end rails, the central portions of which are depressed, and which central portions are recessed or off-set relative to the end portions of said end rails.

8. In a car truck, a truck frame having an end rail the central portion of which is depressed, the end portions of which rail project beyond the face of the central portion of said end rail.

9. In a car truck, a truck frame having side rails, perforated lugs integral therewith adapted to receive the horizontal side bolts utilized for attaching the pedestals, and perforated plates between the pairs of lugs, which perforated plates are adapted to receive pedestal attaching center bolts.

10. In a car truck, a truck frame having side rails substantially channel-shaped in cross section with the flanges projecting inwardly and perforated lugs and plates formed integral with said flanges for receiving the bolts utilized for attaching the pedestals.

11. In a car truck, a truck frame, comprising side rails, the central portions of which are reinforced, perforated lugs integral with said side rails, which lugs are adapted to receive the pedestals fastening bolts, end rails, transoms and axle guards, all of which parts are formed integral.

12. In a car truck, an integral truck frame having transoms, the central portions of which are provided with openings adapted to receive the brake rods and levers of said truck.

13. The herein described car truck frame comprising side rails, end rails, the central portions of which are depressed and which central portions are recessed or off-set relative to their end portions, transoms, the central portions of which are depressed, and wheel guards between the end rails and the transoms, which wheel guards are arched and all of which parts are formed integral.

14. The herein described truck frame comprising wheel pieces, end rails the central portions of which are depressed, transoms, the central portions of which are depressed and provided with openings adapted to receive brake rods and levers of the truck, and arched wheel guards between the end rails and said transoms, all of which parts are cast integral.

15. The herein described car truck frame comprising wheel pieces, end rails and transoms between the wheel pieces, the central portions of which transoms are depressed and provided with openings adapted to receive the brake rods and levers of the truck.

In testimony whereof we hereunto affix our signatures in the presence of two witnesses, this 5th day of July, 1911.

CLARENCE H. HOWARD.
HARRY M. PFLAGER.

Witnesses:
M. P. SMITH,
HAL C. BELLVILLE.